Patented Dec. 24, 1940

2,225,918

UNITED STATES PATENT OFFICE 2,225,918

COATING COMPOSITION

George D. Martin, Nitro, W. Va., assignor to Monsanto Chemical Company, St. Louis, Mo., a corporation of Delaware No Drawing. Application March 26, 1937, Serial No. 133,263

25 Claims. (Cl. 134—39)

The present invention relates to improvements in coating compositions and the process of preparing the same. More particularly, the present invention relates to improvements in coating compositions containing a drying oil, such as paints, varnishes, enamels, linoleums, and the like.

Many types of paints, varnishes and enamels containing drying oils exhibit the opjectionable property of developing tough rubber-like films across their upper surfaces when allowed to stand for a relatively short time in open containers. Such films are usually called "skins" and the process of developing this "skin" formation is called "skinning." In paints or enamels containing certain types of pigments, as well as in mixtures containing relatively large proportions of China wood oil or polymerized linseed oil, this tendency to skin is greatly increased with the result that skins may form on the surface of the mixture even in their unopened containers. This tendency to devlop skin formation is particularly undesirable in dipping operations, where the coating composition in the container is required to be exposed to the air for considerable periods of time while the articles to be coated by the paint, varnish, enamel and the like are immersed therein. Furthermore, in the manufacture of paints, varnishes or enamels and the like, or materials comprising the same, it is usually customary to incorporate therein a small proportion of a positive oxidation catalyst to diminish the time of drying of the oil so that the composition will dry within a reasonable time after it is spread in a thin film. This positive oxidation catalyst is commonly called a dryer or siccative. These dryers or siccatives induce varying forms of oxidation phenomena some of which are highly advantageous and necessary and others which are undesirable and objectionable. Thus, while the dryer or siccative aids in the drying of the film of the coating composition containing the drying oil, it also increases the tendency of the composition to film or skin in the container, and further may catalyze the oxidation process too far during the drying of the coating composition when in the film form.

One object of this invention is to provide a drying oil composition possessing improved properties.

A further object of this invention is to provide a drying oil composition possessing improved resistance to skinning when in the container or in bulk condition.

Another object of this invention is to provide a coating composition, comprising a drying oil, and possessing improved properties.

A further object of this invention is to provide a class of materials, which, when incorporated in a drying oil composition, substantially prevents undesirable oxidation of the composition without materially affecting the normal drying rate thereof when flowed or spread on surfaces in a thin film. Other objects will be hereinafter shown.

According to the present invention the undesirable properties of the so-called dryers and the tendency of drying oil compopsitions, for example, paints, varnishes and the like, to develop skins and undesirable oxidation products have been substantially eliminated by the incorporation therein of a small proportion of an alkylated polyhydric phenol, said alkyl substituent containing a plurality of carbon atoms. Preferably the preferred compounds of the present invention comprise alkylated poly hydric phenols wherein said alkyl substituents contain more than three and less than eleven carbon atoms.

As one method of operating the present invention, portions of a paint, varnish or enamel, which readily skins on contact with the air, were placed in suitable containers, a small proportion of one of the preferred alkylated poly hydric phenols incorporated therein and observations made at regular intervals as to the skinning of the composition.

As specific embodiments of the present invention 20 gram portions of a quick drying enamel comprising a 25 gallon China wood oil varnish containing 2.5% of a mixed lead manganese and cobalt dryer were placed in separate wide mouth open containers. 20 milligrams of n-amyl catechol, secondary amyl catechol, di-tertiary amyl catechol, diisobutyl catechol, di-tertiary amyl hydroquinone, tertiary butyl catechol, di-secondary amyl hydroquinone, amyl pyrogallol, diethyl hydroquinone, di-isopropyl hydroquinone, diisobutyl hydroquinone, di-tertiary butyl hydroquinone, decyl hydroquinone and amyl dichlor hydroquinone, were incorporated therein and a comparison made as to the skinning time of the same enamel containing no inhibitor of skin formation, a temperature of 25° C. being maintained throughout the tests. It was noted that, while the enamel which did not contain an inhibitor of skin formation developed a thick skin in one day, even with the small amounts of the preferred class of inhibitors employed in conjunction with the enamel, in no case was a skin formed in three days. A continuation of the tests showed remarkable stability of the enamel containing the preferred class of compounds against skin formation. This property of preventing skin formation is in particular exhibited by the amylated and other higher alkylated poly hydric phenols wherein the hydroxyl groups are ortho or para to each other. Thus, the above enamel containing 20 milligrams of di-tertiary amyl catechol did not develop a skin formation in 22 days.

Included within the scope of the present invention is the use of hexyl, heptyl, octyl and nonyl poly hydric phenols such as catechol, hydroquinone and resorcinol.

By the term phenols and poly hydric phenols as appearing in this specification and claims is meant hydroxyl substituted benzene compounds.

The preferred compounds of the present invention possess the added advantage in that they do not discolor enamels, paints, varnishes and the like, wherein they are incorporated in sufficient quantity to substantially prevent skinning, as is the case with the polyhydric phenols themselves and further the preferred compounds do not substantially affect the normal drying time of the coating compositions after they have been flowed or painted on surfaces. Thus, a remarkable improvement has been made over the use of phenolic compounds as for example hydroquinone, catechol and the like in coating compositions.

The preferred compounds of the present invention are soluble in drying oils and their use therein is therefore markedly superior to the use of unsubstituted poly hydric phenols or to the methyl substituted poly hydric phenols, such as for example ortho methyl hydroquinone, which are substantially insoluble in drying oils.

A further improvement and advantage in the use of the preferred class of compounds lies in their insolubility in water, whereas poly hydric phenols, as for example catechol, hydroquinone and resorcinol, and even methyl hydroquinone are readily soluble in water. In paints, and in particular in paints which are exposed to weathering in the film form, it is highly undesirable that a water soluble product be incorporated therein. It is well-known to those skilled in the art of paint manufacture that the use of such water soluble products in paint compositions tends to produce pin holes and pitting in the paint film after exposure to the weather. A further advantage in the use of the preferred class of materials over the use of the poly hydric phenols themselves, or even over the use of their methyl substituted derivatives, as for example ortho methyl hydroquinone, lies in their increased solubility in typical paint solvents or thinners, for example mineral spirits, which greatly facilitates and enhances their usefulness in paints, varnishes, enamels and the like manufacture.

While the amount of preferred class of materials employed in the specific embodiments of the invention as set forth above is 0.1% based on the weight of the total drying oil composition, the quantities employed may be varied depending on the specific composition of the coating material. Generally it is found that less than 1% of the preferred material will be sufficient. Ordinarily 0.05 to 0.50% is sufficient. It is obvious that the processes and compositions described herein may be varied widely in their details without departing from the spirit or scope of the present invention. The present invention is limited solely by the appended claims.

What is claimed is:

1. A coating composition containing a vegetable drying oil of the type which rapidly develops skin formation in the bulk condition having incorporated therein a retarder of skin formation comprising an alkylated poly hydric phenol, said alkyl substituent containing a plurality of carbon atoms.

2. A coating composition containing a vegetable drying oil of the type which rapidly develops skin formation in the bulk condition having incorporated therein a retarder of skin formation comprising an alkylated poly hydric phenol, said alkyl substituents containing more than three and less than eleven carbon atoms.

3. A coating composition containing a vegetable drying oil of the type which rapidly develops skin formation in the bulk condition having incorporated therein a retarder of skin formation comprising an amylated poly hydric phenol.

4. A coating composition containing a vegetable drying oil of the type which rapidly develops skin formation in the bulk condition having incorporated therein a retarder of skin formation comprising an amylated dihydric phenol.

5. A coating composition containing a vegetable drying oil of the type which rapidly develops skin formation in the bulk condition having incorporated therein a retarder of skin formation comprising an alkylated catechol, said alkyl substituents containing a plurality of carbon atoms.

6. A coating composition containing a vegetable drying oil of the type which rapidly develops skin formation in the bulk condition having incorporated therein a retarder of skin formation comprising an alkylated catechol, said alkyl substituents containing more than three and less than eleven carbon atoms.

7. A coating composition containing a vegetable drying oil of the type which rapidly develops skin formation in the bulk condition having incorporated therein a retarder of skin formation comprising an alkylated hydroquinone, said alkyl substituents containing a plurality of carbon atoms.

8. A coating composition containing a vegetable drying oil of the type which rapidly develops skin formation in the bulk condition having incorporated therein a retarder of skin formation comprising an alkylated hydroquinone, said alkyl substituents containing more than three and less than eleven carbon atoms.

9. A coating composition containing a vegetable drying oil of the type which rapidly develops skin formation in the bulk condition having incorporated therein a retarder of skin formation comprising amylated catechol.

10. A coating composition containing a vegetable drying oil of the type which rapidly develops skin formation in the bulk condition having incorporated therein a retarder of skin formation comprising di tertiary amyl catechol.

11. A coating composition containing a vegetable drying oil of the type which rapidly develops skin formation in the bulk condition having incorporated therein a retarder of skin formation comprising amylated hydroquinone.

12. A coating composition containing a vegetable drying oil of the type which rapidly develops skin formation in the bulk condition having incorporated therein a retarder of skin formation comprising di tertiary amyl hydroquinone.

13. A coating composition containing a vegetable drying oil of the type which rapidly develops skin formation in the bulk condition having incorporated therein a retarder of skin formation comprising decyl hydroquinone.

14. The improvement in the manufacture of coating compositions characterized by resistance to skin formation in the bulk condition which comprises mixing the coating composition containing a vegetable drying oil of the type which rapidly develops skin formation in the bulk condition with an alkylated poly hydric phenol, said alkyl substituents containing a plurality of carbon atoms.

15. The improvement in the manufacture of coating compositions characterized by resistance to skin formation in the bulk condition which comprises mixing the coating composition containing a vegetable drying oil of the type which rapidly develops skin formation in the bulk condition with an alkylated poly hydric phenol, said alkyl substituents containing more than three and less than eleven carbon atoms.

16. The improvement in the manufacture of coating compositions characterized by resistance to skin formation in the bulk condition which comprises mixing the coating composition containing a vegetable drying oil of the type which rapidly develops skin formation in the bulk condition with an amylated dihydric phenol.

17. The improvement in the manufacture of coating compositions characterized by resistance to skin formation in the bulk condition which comprises mixing the coating composition containing a vegetable drying oil of the type which rapidly develops skin formation in the bulk condition with an alkylated catechol, said alkyl substituents containing a plurality of carbon atoms.

18. The improvement in the manufacture of coating compositions characterized by resistance to skin formation in the bulk condition which comprises mixing the coating composition containing a vegetable drying oil of the type which rapidly develops skin formation in the bulk condition with an alkylated hydroquinone, said alkyl substituents containing a plurality of carbon atoms.

19. The improvement in the manufacture of coating compositions characterized by resistance to skin formation in the bulk condition which comprises mixing the coating composition containing a vegetable drying oil of the type which rapidly develops skin formation in the bulk condition with amylated catechol.

20. The improvement in the manufacture of coating compositions characterized by resistance to skin formation in the bulk condition which comprises mixing the coating composition containing a vegetable drying oil of the type which rapidly develops skin formation in the bulk condition with amylated hydroquinone.

21. The improvement in the manufacture of coating compositions characterized by resistance to skin formation in the bulk condition which comprises mixing the coating composition containing a vegetable drying oil of the type which rapidly develops skin formation in the bulk condition with decyl hydroquinone.

22. A coating composition characterized by resistance to skin formation in the bulk condition containing a vegetable drying oil of the type which rapidly develops skin formation in the bulk condition having incorporated therein a positive oxidation catalyst and a controller of oxidation thereof having the property of substantially retarding said skinning of said coating composition without materially affecting the normal drying of the coating composition in thin film form comprising an alkylated poly hydric phenol, said alkyl substituent containing a plurality of carbon atoms.

23. A coating composition characterized by resistance to skin formation in the bulk condition containing a vegetable drying oil of the type which rapidly develops skin formation in the bulk condition having incorporated therein a positive oxidation catalyst and a controller of oxidation thereof having the property of substantially retarding said skinning of said coating composition without materially affecting the normal drying of the coating composition in thin film form comprising an alkylated poly hydric phenol, said alkyl substituents containing more than three and less than eleven carbon atoms.

24. A coating composition characterized by resistance to skin formation in the bulk condition containing a polymerized fatty drying oil of the type which rapidly develops skin formation in the bulk condition having incorporated therein a positive oxidation catalyst and a controller of oxidation thereof having the property of substantially retarding the skinning of said coating composition without materially affecting the normal drying of the coating composition in film form comprising an alkylated poly hydric phenol, said alkyl substituent containing a plurality of carbon atoms.

25. A coating composition characterized by resistance to skin formation in the bulk condition containing a polymerized fatty drying oil of the type which rapidly develops skin formation in the bulk condition having incorporated therein a positive oxidation catalyst and a controller of oxidation thereof having the property of substantially retarding the skinning of said coating composition without materially affecting the normal drying of the coating composition in film form comprising an alkylated poly hydric phenol, said alkyl substituents containing more than three and less than eleven carbon atoms.

GEORGE D. MARTIN.